United States Patent [19]

Blackborow et al.

[11] Patent Number: 5,297,067

[45] Date of Patent: Mar. 22, 1994

[54] ELECTRONIC HOT CONNECTION OF DISK DRIVE MODULE TO COMPUTER PERIPHERAL BUS

[75] Inventors: Richard J. Blackborow, Cupertino; John Brooks, San Jose; Jeffery H. Appelbaum, San Mateo; Garrick Yeung; Faheem Dani, both of San Jose; Tim R. Glassburn, Milpitas, all of Calif.

[73] Assignee: Quantum Corporation, Milpitas, Calif.

[21] Appl. No.: 778,446

[22] Filed: Oct. 16, 1991

[51] Int. Cl.$^5$ .............................................. G06F 3/00
[52] U.S. Cl. .................. 364/708.1; 369/75.1; 395/325; 360/137
[58] Field of Search ............ 369/75.1; 364/708; 395/325; 360/137

[56] References Cited

U.S. PATENT DOCUMENTS

| | | | |
|---|---|---|---|
| 4,833,554 | 5/1989 | Dalziel et al. | 360/98.04 |
| 4,941,841 | 7/1990 | Darden et al. | 439/377 |
| 5,005,089 | 4/1991 | Thanos et al. | 360/77.08 |
| 5,041,924 | 8/1991 | Blackborow et al. | 360/69 |
| 5,157,771 | 10/1992 | Losi et al. | 395/325 |

FOREIGN PATENT DOCUMENTS 2594997 8/1987 France .

OTHER PUBLICATIONS

SQ 312RD OEM Manual, Syquest Technology.

*Primary Examiner*—Joseph L. Dixon
*Assistant Examiner*—David L. Robertson
*Attorney, Agent, or Firm*—David B. Harrison

[57] ABSTRACT

A mass storage subsystem is connectable to a host computer via a host adapter and includes a subsystem bus extending from the host adapter to at least one base unit and a removable disk drive cartridge for use with the base unit. A control signal path extends between the base unit and the removable disk drive cartridge when it is installed and connected within the base unit. The disk drive cartridge includes a housing, at least one storage disk rotatably mounted within the housing, at least one data transducer head within the housing and positionable by a head positioner at selected concentric data storage tracks defined on a storage surface of the storage disk. A bus interface circuit is provided for directly connecting to the subsystem bus when the cartridge is installed and connected within the base unit, and a cartridge controller is provided for controlling operations of the bus interface circuit and the head positioner and for communicating with the base unit via the control signal path. The base unit comprises a disk cartridge receiving structure for receiving and connecting the disk drive cartridge, a stand-in interface circuit connected to the subsystem bus means for presenting an active and "drive not ready" disk cartridge appearance to the subsystem bus when the disk drive cartridge is not installed and connected within the base unit, and a base unit controller including a cartridge control for controlling operations of the disk cartridge receiving structure, and a stand-in interface control for communicating with the cartridge controller via the control signal path and for thereupon controlling stand-in operation of the stand-in interface circuit.

13 Claims, 12 Drawing Sheets

SIMULTANEOUS BUS REQUEST

ELECTRONIC HOT CONNECTION OF DISK DRIVE MODULE TO COMPUTER PERIPHERAL BUS

FIELD OF THE INVENTION

The present invention relates to miniature fixed disk data storage subsystems. More particularly, the present invention relates to a data storage subsystem including a fully self contained removable hard disk drive module, its base unit or receptacle for automatically loading and unloading the module, and a host adaptor for connection of the subsystem to a host computing system.

BACKGROUND OF THE INVENTION

The advantages of hard disk drives within computing systems are generally recognized in the main to be significant data storage capacity and rapid random access to the data being stored access which is much faster than slower storage devices, such as floppy disks which typically provide lesser data storage capacity and longer data access times. One drawback of hard disk drives is that the disks are typically fixed within the housing of the disk drive and may not be conveniently removed, either for safekeeping, or for use within another computing system at another location. This drawback is further amplified by the current large sizes of operating systems and applications software (as well as relevant data bases) needed to establish a computing environment. If the computing environment is desired to be transportable from one hardware environment to another similar hardware environment, a high storage capacity, low access time, high performance data storage module is required.

One proposed solution has been a hard disk cartridge, exemplified by the Syquest Technology SQ312RD removable disk cartridge drive. One drawback of the hard disk cartridge is the difficulty in maintaining a very clean environment within the cartridge needed to prevent damage between the data storage disk and a closely flying data transducer head. Another difficulty has been associated with the need to load and unload the data transducer head slider from proximity with the data storage surface without contacting or otherwise causing abrasion or damage to the delicate data storage media formed on the disk surface. Another disk cartridge technology is the so-called "Bernoulli Box" product line, made by Iomega Corporation.

Another prior solution has been to include a hard disk drive within a shock-mounting module which may be plugged into and removed from a base unit or receptacle. One example of this prior approach is found in the Dalziel et al. U.S. Pat. No. 4,833,554 which discloses a mechanized receptacle for automatically inserting and removing the hard drive module from the receptacle. One drawback of the Dalziel et al. approach was that the disk drive module was relatively large, and did not fit within a standard space allotted to a disk drive within a computing system, such as a so-called "half-height" 5.25" drive bay within a personal computer.

This drawback was solved by the commonly assigned Blackborow et al. U.S. Pat. No. 5,041,924 entitled: "Removable and Transportable Hard Disk Subsystem", the disclosure of which is incorporated herein by reference. This later invention provided a micro-Winchester (3.5 inch diameter) head and disk module for use within a fully automated module insertion and removal base unit. The base unit occupied no more than the standard 5.25", half height form factor drive bay provided in a typical personal computer for a floppy disk or a hard disk. One drawback of the system described in the referenced and commonly assigned Blackborow et al. U.S. patent was that the interface was limited to a particular host computer architecture, such as the IBM PC or AT architecture. Aesthetic, non-functional details of the drive module are shown in commonly assigned U.S. Pat. No. Des. 311,737 issued Oct. 30, 1990.

A manual drive module/receptacle which fits within a 5.25" half height drive bay in a computer is described in U.S. Pat. No. 4,941,841. This patent describes a concept which appears to be very similar to one advanced in an earlier French patent disclosure document No. 2,594,997, published on Aug. 28, 1987.

More universal interfaces have since become standard for small computing systems. One such interface is the Small Computer System Interface or "SCSI". This interface is a bus-level or "intelligent" interface which is supported on an industry wide basis, and is specified e.g. by ANSI X3.131-1986, Small Computer System Interface Specification Common Command Set, Rev. 4B. One advantage of the SCSI intelligent interface is that it may be used on one side with a virtually unlimited variety of host computing systems, not just one particular system; and, it may be used on the other side with a very wide variety of disk drives having differing data storage capacities, etc.

SUMMARY OF THE INVENTION WITH OBJECTS

A general object of the present invention is to provide a fully self contained, removable hard disk drive module, and a base unit or receptacle, for connection of the module to a host computing system in a manner which overcomes limitations and drawbacks of the prior art approaches.

A more specific object of the present invention is to provide a data storage subsystem which includes a hard disk drive module which may contain one of a wide variety of standard configuration fixed disk drives having a bus level interface, such as SCSI, and having a minimum of additional special circuitry and firmware needed for communications between the module and a base unit receptacle.

Another specific object of the present invention is to provide a base unit or receptacle for a slightly modified standard low profile SCSI fixed disk drive module wherein the base unit includes a stand-in SCSI target interface controller for satisfying SCSI bus operational requirements whenever the drive module is removed from the receptacle or is otherwise unavailable for data transfer operations.

Yet one more specific object of the present invention is to provide an arrangement enabling "hot" connection and disconnection of a fully contained disk drive module with a computing system without interfering with operations of a peripheral bus of the computing system.

Yet one more specific object of the present invention is to provide a command and message protocol by which a stand-in interface on a base unit (or receptacle) may pass control of a peripheral bus to an interface on a removable-cartridge peripheral data unit, such as a disk drive data storage unit.

In accordance with one facet of the present invention, a mass storage subsystem is connectable to a host computer and includes a subsystem bus extending from the host computer to at least one base unit and a removable disk drive cartridge for use with the base unit. A control signal path extends between the base unit and the removable disk drive cartridge when it is installed and connected within the base unit.

The disk drive cartridge includes a housing, at least one storage disk rotatably mounted within the housing, at least one data transducer head within the housing and positionable by a head positioner at selected concentric data storage tracks defined on a storage surface of the storage disk, and drive electronics. A bus interface circuit of the drive electronics is provided for directly connecting to the subsystem bus when the cartridge is installed and connected within the base unit, and a cartridge controller of the drive electronics is provided for controlling operations of the bus interface circuit and the head positioner and for communicating with the base unit via the control signal path.

The base unit (or receptacle) comprises a disk cartridge receiving structure, most preferably of the type disclosed in the referenced U.S. Pat. No. 5,041,924, for receiving and automatically connecting the disk drive cartridge. A stand-in interface circuit is connected to the subsystem bus and presents an active and "drive not ready" disk cartridge electrical appearance to the subsystem bus when the disk drive cartridge is not installed and connected within the base unit. A base unit controller includes a cartridge control for controlling automatically the cartridge load and unload operations of the disk cartridge receiving structure. A stand-in interface control communicates with the cartridge controller via the control signal path and thereupon controls stand-in electrical appearance of the stand-in interface circuit.

In one aspect of this facet of the present invention, the subsystem bus comprises a SCSI bus.

In another aspect of this facet of the invention, a plurality of base units and associated cartridges may be connected to the subsystem bus.

In a further aspect of this facet of the invention, the control signal path comprises a dedicated control path separate from the subsystem bus.

As a related facet of the present invention, a method is provided for controlling a mass storage subsystem connectable to a host computer via a host adapter and comprising a subsystem bus extending from the host adapter to at least one base unit and a removable disk drive cartridge, and a control signal path between the base unit and the removable disk drive cartridge when installed and connected within the base unit, the disk drive cartridge including a housing, at least one data transducer head within the housing and positionable by a head positioner at selected concentric data storage tracks defined on a storage surface of the storage disk, a disk cartridge interface circuit for directly connecting to the subsystem bus when the cartridge is installed and connected within the base unit, and a cartridge controller for controlling operations of the disk cartridge interface circuit and the head positioner and for communicating with said base unit via the control signal path.

The method comprises the steps of:

emulating at the base unit the appearance of the disk drive cartridge in a non-operative, yet active electrical condition at the subsystem bus with a stand-in interface circuit when the disk drive cartridge is not installed and connected or otherwise ready for data transfer operations within the base unit, receiving and connecting a disk drive cartridge at the base unit, and communicating with the cartridge controller via the control signal path in order to determine that the disk cartridge is ready for data transfer operations and that its interface circuit is ready to assume an operative electrical condition at the subsystem bus, and thereupon causing the stand-in interface circuit to remove its non-operative active electrical condition from the subsystem bus once the cartridge interface presents its operative active electrical condition at the subsystem bus.

As an aspect of this facet of the invention, the stand-in interface circuit and the disk cartridge interface occupy the same logical address location on the subsystem bus.

As a related aspect of this facet of the invention, the subsystem bus comprises a SCSI bus.

As a related facet of the present invention, a data storage subsystem includes a removable hard disk drive module having a bus-level interface circuit and a base unit for automatically loading and unloading the hard disk drive module in response to control signals received from a host computer to which the base unit is connected via a host bus adapter. A method is provided within this structural environment for passing between the module and the base unit an electrical appearance of the data storage subsystem to the computer at a single logical address. The method comprises the steps of:

presenting via a stand-in interface circuit of the base unit an active electrical "drive not ready" appearance to the host computer when the drive module is not loaded and ready for data transfer operations, determining at the base unit when the drive module becomes loaded and ready for data transfer operations and thereupon activating the bus-level interface circuit of the drive module and disabling the stand-in interface circuit, and determining at the base unit when the drive module is about to be unloaded and thereupon activating the stand-in interface circuit and disabling the bus-level interface circuit of the drive module.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the Drawings:

FIGS. 2A and 2B are arranged respectively as left and right panels to form one diagram; and, FIGS. 2C and 2D are arranged respectively as left and right panels to form a second diagram.

DETAILED DESCRIPTION OF A PREFERRED EMBODIMENT

Figure 1:
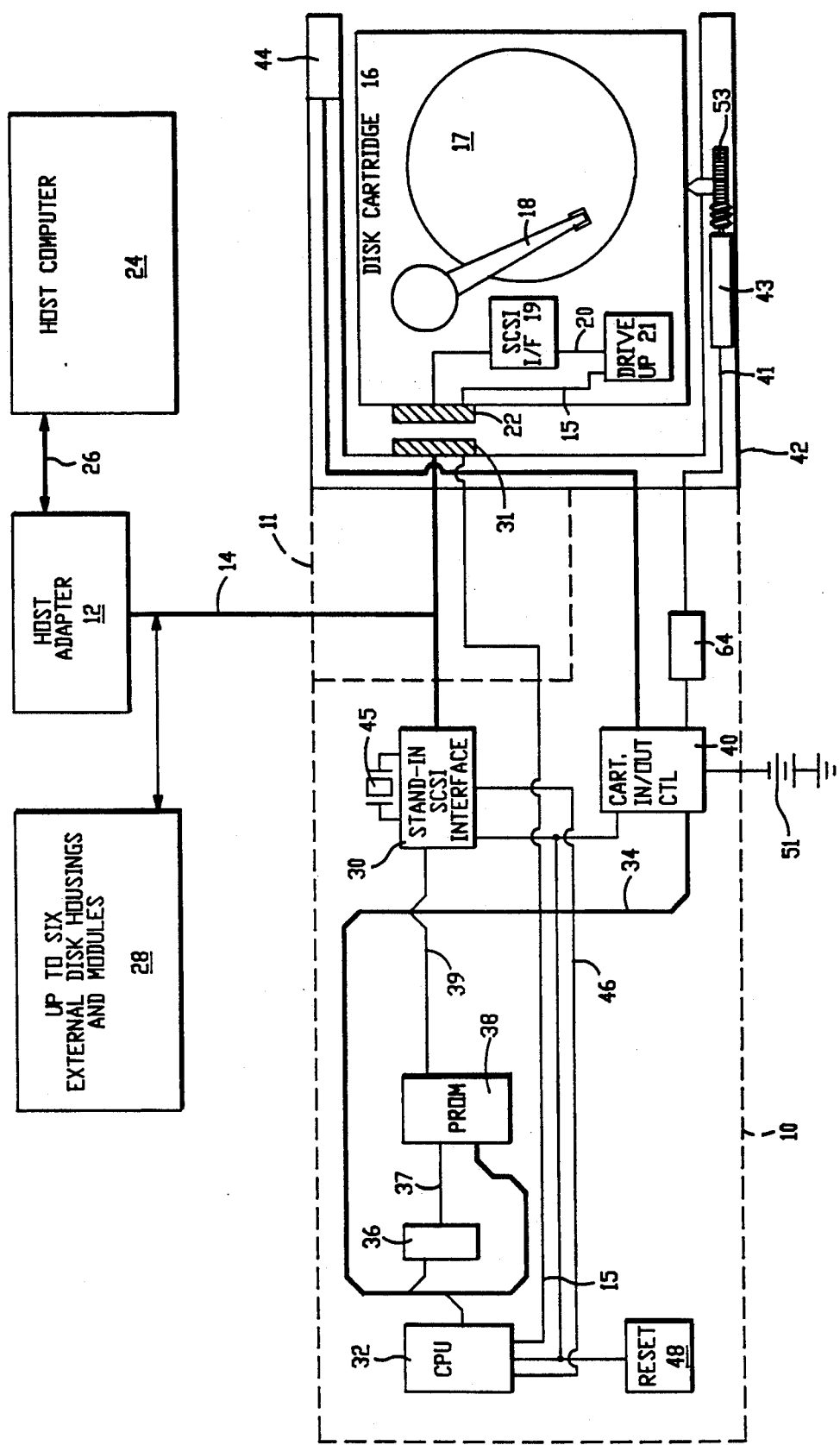
FIG. 1 is a block diagram of a data storage subsystem in accordance with the present invention and including a removable hard disk drive module, its base or receptacle, up to six additional SCSI disk drives, and a SCSI host adapter for connection of the subsystem and the other drives to a host computing system.

With reference to FIG. 1, a removable disk module storage subsystem in accordance with the present invention essentially comprises a base unit 10 including a rear printed circuit board 11 for making electrical connections to a host adapter 12 and to a disk cartridge 16. The SCSI host adaptor 12 is connected to the base unit 10 by a conventional SCSI bus 14 (most typically implemented as a multi-wire SCSI connector cable). The host adapter 12 is in turn connected to a host computer 24 via a standard bus-level connection arrangement, denoted by the bidirectional path 26 in FIG. 1. While other bus-level interfaces, such as the so-called AT or "IDE" interface, may be employed, the SCSI interface is particularly preferred because of the wide variety of host computers which include embedded SCSI adapters, and because SCSI adapters are now produced for many different hosts. While the host adapter 12 shown in FIG. 1 is shown separated from the host computer 24 by the bus 26, in practice, the host adapter 12 is included within the housing of the host computer 24, e.g. in the form of an expansion function electronic circuit board plugged into a bus expansion slot of the computer, for example.

A disk cartridge 16 may take on many forms. Preferably, although not necessarily, the cartridge 16 includes one or more rotating data storage disks 17, a mass balanced rotary actuator head positioner structure 18, a SCSI interface disk drive interface circuit 19, an internal bus structure 20, and an embedded microcontroller 21. The module 16 further includes a jack 22 which enables electrical connection paths to be established with a plug 31 connected to the rear printed circuit board 11, and hence with the SCSI bus 14 when the module 16 is fully loaded into a receptacle 42 of the base unit 10. A special control/status bus 15 interconnects the base unit 10 and the cartridge 16. The storage subsystem may also include up to six external disk housings and modules 28 which also connect directly to the SCSI bus 14 as SCSI target devices.

Most preferably, the SCSI disk drive contained within the module 16 is as described, for example, in commonly assigned U.S. Pat. No. 5,005,089, as modified to occupy a low height profile of one inch or less (as taught for example by commonly assigned U.S. Pat. No. 4,712,146). Improvements of the disk drive described in the referenced U.S. Pat. No. 5,005,089 are described in the referenced, commonly assigned, copending U.S. patent application Ser. No. 07/556,945 filed on Jul. 20, 1990, entitled "Head Position Recalibration for Disk Drive", now U.S. Pat. No. 5,227,930, and Ser. No. 07/762,683 filed on Sep. 19, 1991, entitled "Low Profile, High Capacity Micro-Winchester Disk Drive".

The base unit 10 includes a stand-in SCSI interface circuit 30 and a microcontroller 32. The stand-in SCSI interface circuit 30 functions to "stand-in" or take the place of the cartridge drive's SCSI interface circuit 19 whenever the cartridge unit 16 is not available, as by being removed from the base unit 10. The microcontroller 32 includes a 4K internal program memory, which is sufficient for normal functions thereof. The microcontroller 32 also connects to the stand-in interface circuit 30 via an internal data and address bus 34. In order to extend the size of a program executed by the microcontroller 32, and to provide for diagnostics and program development, the bus 34 may be extended to an address latch 36 and to a programmable read only memory array 38 which contains further program instructions executed by the base unit microcontroller 32.

A cartridge in/out control interface circuit 40 also connects to the bus 34 and to the receptacle 42. The control circuit 40 extends to a control bus 41 having conductors leading to the receptacle 42 and from there to a load/unload motor 43, and also to an array of switches and an LED indictor which are together depicted as element 44 in FIG. 1. A small 7.2 volt NiCad battery 51 provides standby power through the control circuit 40 to power the small DC drive motor in the unlikely event of a primary power failure. A charging circuit maintains the charge in the NiCad battery 51 when primary power is available.

The load/unload motor 43 actuates e.g. a rack-and-pinion loading and unloading mechanism 53 contained entirely within a sidewall of the receptacle 42, as taught in the referenced and incorporated U.S. Pat. No. 5,041,924.

Circuit details of the circuitry of the base unit 10 are depicted in the diagrams of FIGS. 2A and 2B, and FIGS. 2C and 2D. Turning first to the FIG. 2A-2B diagram, the microcontroller 32 is most preferably implemented with a standard type 8051 microcontroller, made by Intel Corp., or equivalent. The microcontroller 32 is responsible for directing activities within the base unit 10. These activities in overview include ejecting and loading the disk cartridge 16 at the receptacle 42, communicating with the cartridge 16, supplying sequenced power to the cartridge 16, acting as a SCSI stand-in target when no cartridge is present, and terminating the SCSI bus 14.

The microcontroller 32 contains e.g. 4 k bytes of internal read only memory and 128 bytes of internal random access memory. The program for running the controller 32 is essentially contained in the internal program memory space. The controller 32 has four general purpose input/output ports. The P0 port is used as an 8 bit, time multiplexed address and data bus. The P2 port is used as the upper 8 bits of address. Thus, the microcontroller 32 is able directly to access up to 65,536 external memory locations located in the external program memory 38, while transferring 8 bit words for each address location over the 8 bit address and data bus 34.

The microcontroller 32 can be forced to do external program memory fetches by jumpering an external jumper W1 at the microcontroller 32 to ground. All program memory fetches then use the program data contained in the external PROM 38 when the W1 jumper is set. The addressing for the external PROM 38 is the same as for the internal ROM. The external PROM 38 is to be used for debugging and in case there are problems with the masked ROM versions of the 8051 microcontroller 32, thereby facilitating ready program upgrades. The AD7-0 bus 37 is latched into an address latch 36 in order to preserve the lower 8 bits of address in a read of the external PROM 38 onto the data bus 34. Address bits A12-A8 are sent to the PROM 38 to give an addressing capability of 8K bytes. EPROM sizes from 2732 to 27256 may be used for the PROM 38.

The stand-in SCSI interface controller 30 is substantially identical with the SCSI interface controller state machine 19 found in the disk cartridge 16. The interface controller 30 interfaces the microcontroller 32 to the SCSI bus 14. The interface controller 30 consists of 32 ports in the I/O space of the microcontroller 32, and includes a state machine which is responsible for providing all timing and control of the SCSI bus 14 when the interface circuit 30 is active. The interface circuit 30 is acting as a SCSI target in the FIG. 1 environment. The microcontroller 32 reads and writes the interface ports via the 8 bit address/data bus 34. There is an internal address latch in the interface circuit 30, and the lower 6 bits of address are latched by microcontroller signal ALE which extends to the interface circuit 30. The upper two address bits are hardwired from microcontroller Port 2. The interface ports are read and written 8 bits at a time by the RD and WR strobes from the microcontroller 32. The interface circuit 30 is selected for read or write when A15 is high. The interface circuit 30 indicates to the microcontroller its need for service by activating its interrupt line which is sent to the INT0 input of the microcontroller 32. Whenever the SCSI bus 14 is reset, an interrupt is sent to the microcontroller 32 by a signal -HRST. -HRST is OR'd with a signal -SPINT and then sent to INT0 of the microcontroller. Both of these interrupts are latched internally by the interface circuit 30. The microcontroller 32 determines which interrupt latches, in case of simultaneous interrupts. -CRST indicates that the cartridge power on reset is active. This signal is sent to the INT1 interrupt of the microcontroller 32. The microcontroller 32 masks off INT1 when there is no power being applied to the cartridge 16.

A jumper field JP2 provides a series of jumpers for setting certain configurations for the main circuit board 10. A2–A0 set the SCSI ID for the cartridge 16. A2 is the most significant bit, and A0 is the least significant bit. A jumper installed on jumper field JP2 indicates logic "1". Enabling the circuit board 10 as a SCSI terminator is accomplished by jumpering ET. In an external unit 28, a cable will be connected to an external switch instead of jumpering the A2–A0 pins. SCSI parity checking is enabled by jumpering W2. A jumper being present is a default condition and is established by a trace bridge connection on the printed circuit board 10.

The clock source for the interface circuit 30 is a crystal 45. The crystal 45 drives the interface circuit 30 directly, and an internal oscillator circuit divides the 16 MHz frequency of the crystal 45 to 8 MHz which is then sent back to the microcontroller 32 over the line 46.

The latch 40 provides an output port for the microcontroller 32. There are bit positions to turn on +5 V and +12 V power to the disk cartridge 16, to actuate the load/unload motor 43 to move the cartridge in and out, and a bit to operate the status LED. All bits are active high. The address for this port is A14 true and is asserted when A14 is true and -WR is also true.

The circuit 48 (FIG. 2A) provides a power on reset controller for the circuit board 10. It resets the interface circuit 30, the microcontroller 32 and the output port latch 40. The resetting of the output port latch 40 insures that all of its control signals are off at power up. The reset circuit 48 also monitors the +5 V and +12 V power buses.

Figure 2A:
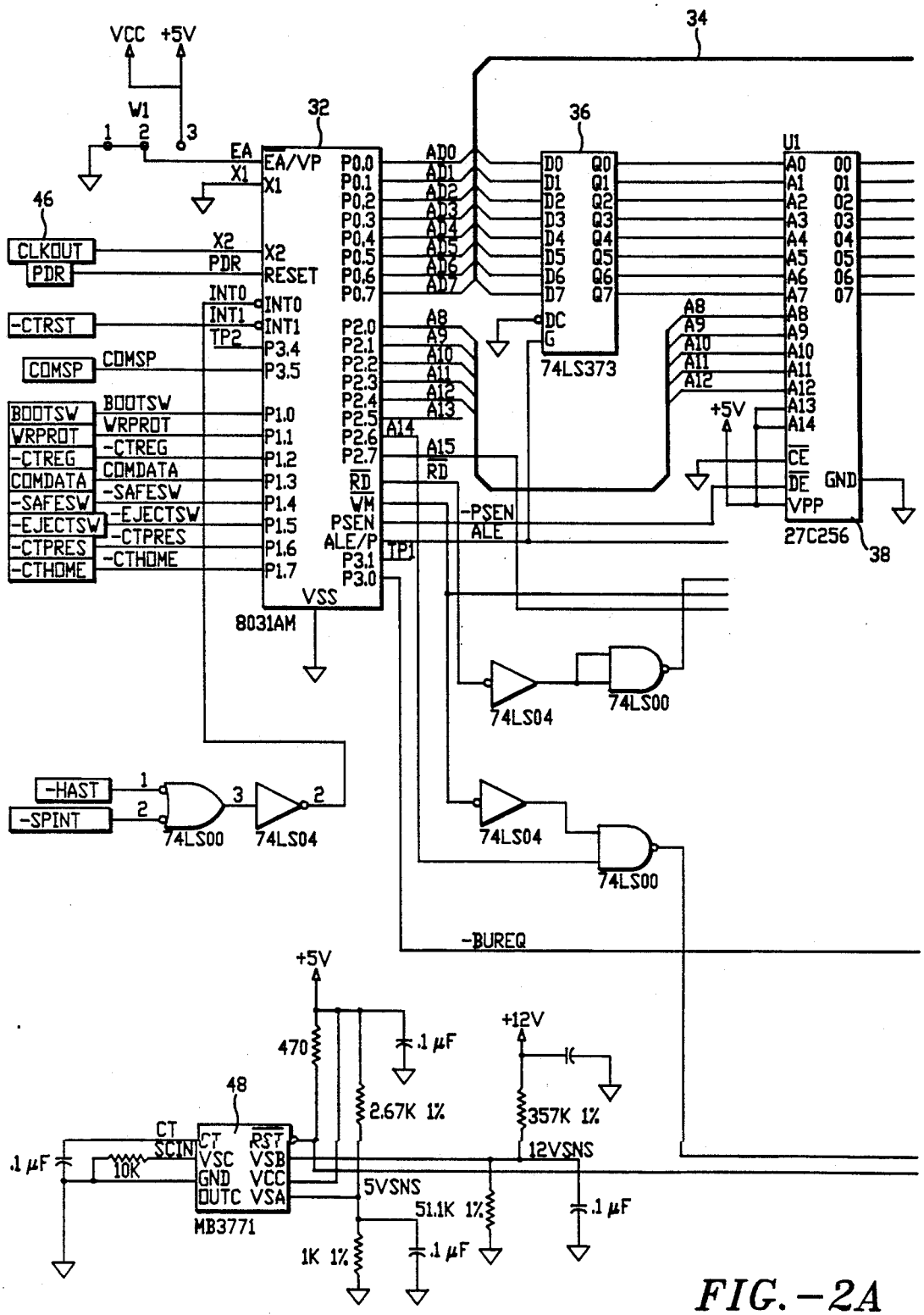
FIGS. 2A, 2B, 2C and 2D represent two detailed block and schematic circuit diagrams comprising the FIG. 1 base unit.
Figure 2B:
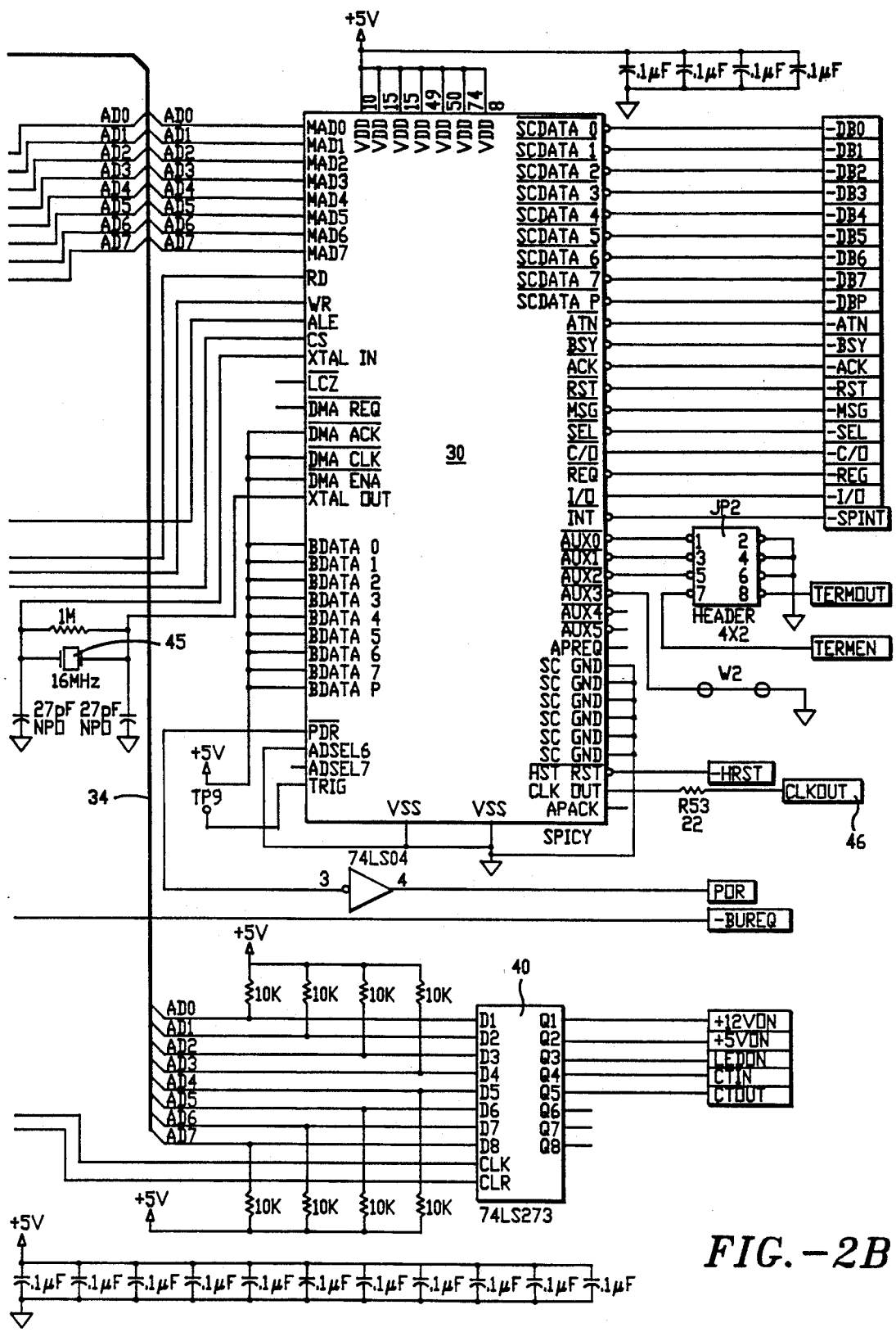

The 10K pullup resistors on the AD bus 34 shown adjacent the latch 40 in FIG. 2B guarantee a good high logic level to the interface circuit 30 (which is implemented with CMOS VLSI logic) whenever the bus 34 is being floated by the microcontroller 32.

Port 1 of the microcontroller 32 (FIG. 2A) is configured as an eight bit input port. Each bit position has a dedicated function. A boot switch signal -BOOTSW indicates that the cartridge 16 is set to be bootable (i.e. containing an operating system at a bootstrap load position). A write-protect signal -WRPROT indicates that the cartridge 16 has been set to be write protected, or "read only". A safety switch signal -SAFESW indicates that a safety switch has been tripped. An eject cartridge switch signal -EJECTSW indicates that a cartridge eject switch of the base unit 10 is being actuated by the user. A cartridge-present sensing signal -CTPRES indicates that a cartridge 16 is present within the base unit 10 (and therefore ready to be automatically installed by actuation of the mechanism 43). A cartridge-home sense signal -CTHOME indicates that the cartridge 16 is now fully installed and connected ("all the way home") within the base unit 10.

The LED is driven by a driver circuit through a pullup resistor of 220 ohms. The +5 V to the cartridge 16 is switched through a dual N-Channel FET switch. A driver is used to drive the gates of the FET switch all the way to +12 volts in order to turn on the FET switch fully. The +12 V to the cartridge is switched through a dual P-channel FET.

Figure 2C:
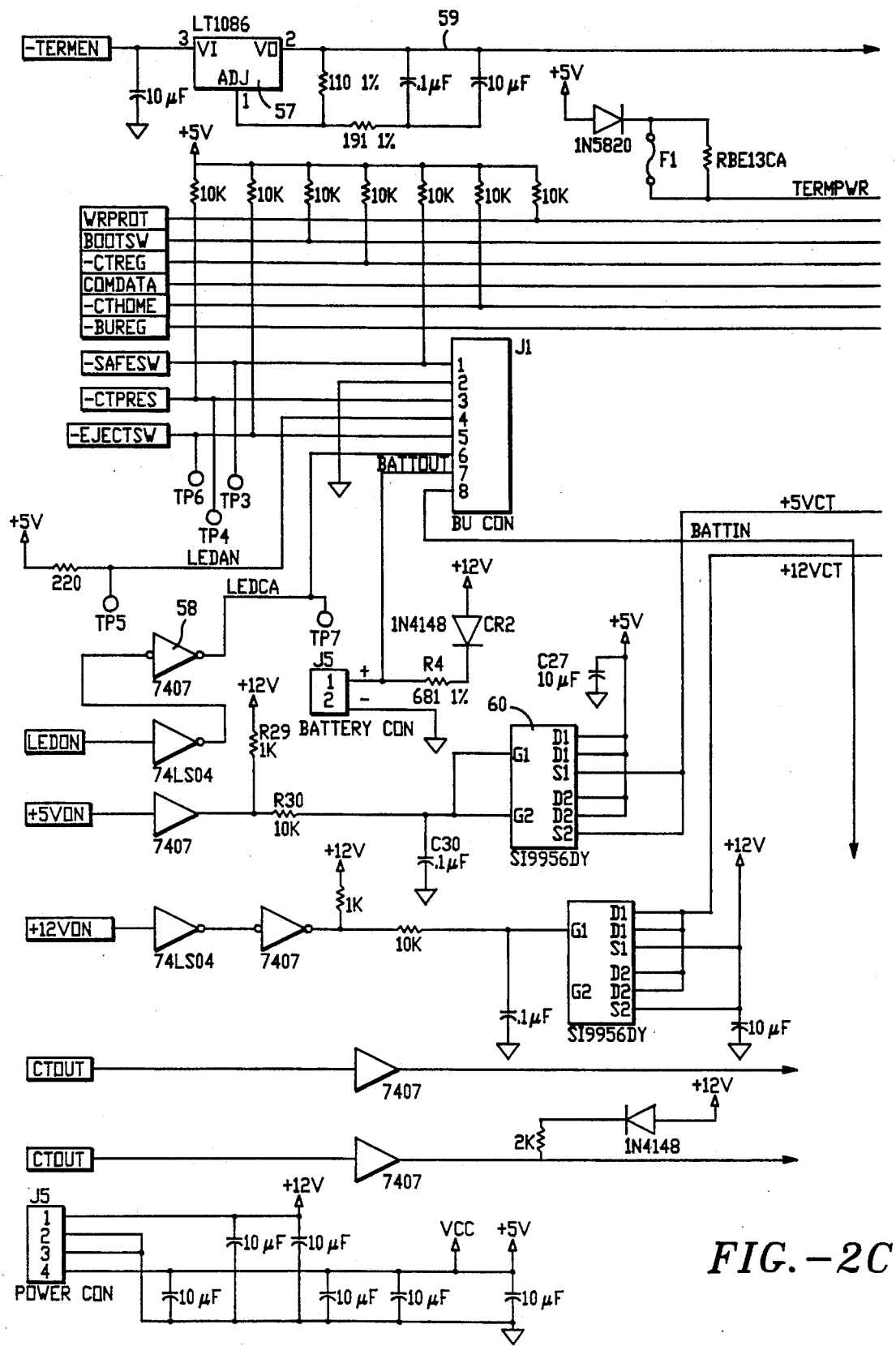
Figure 2D:
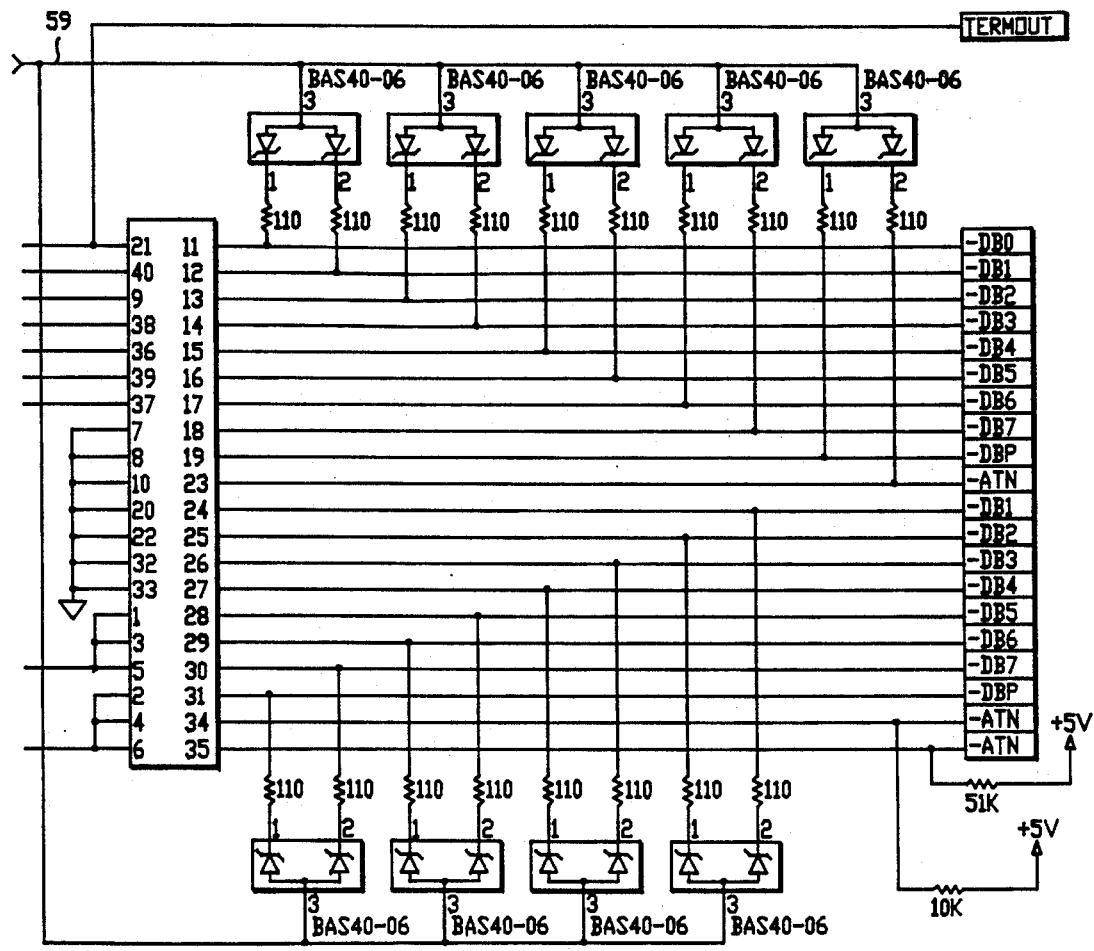
Figure 2D:
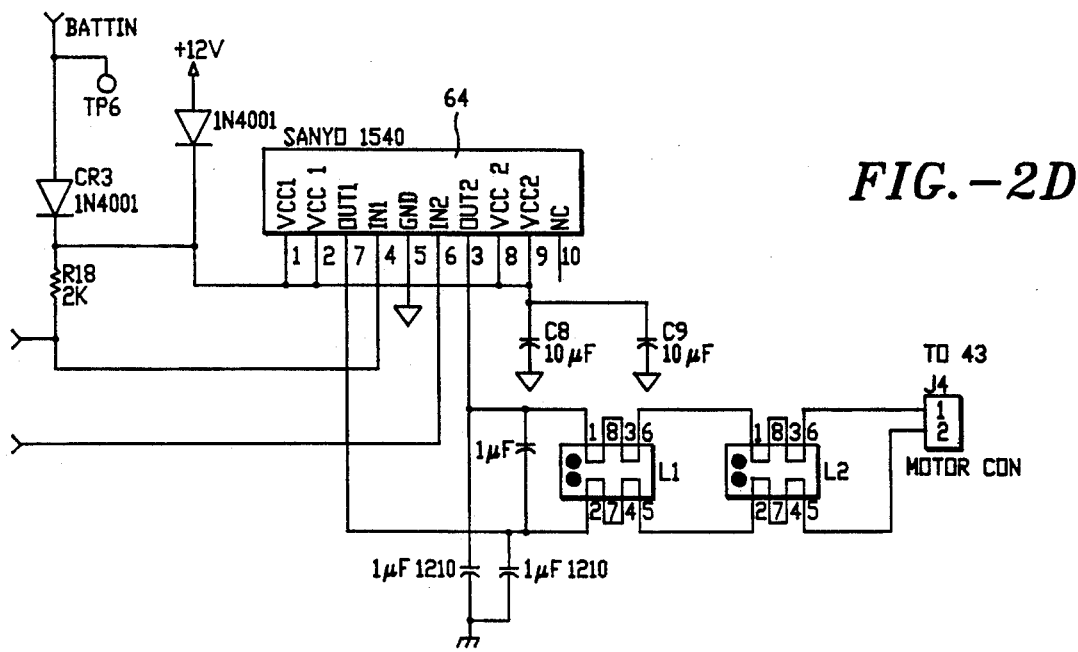

A motor controller circuit 64 is used to drive the load/unload motor 43. If the cartridge 16 is to be loaded, the CTIN signal is activated, and the circuit 55 activates signal OUT2 to load the cartridge. If the cartridge is to be ejected, the CTOUT signal is activated, and 64 activates signal OUT1 to eject the cartridge 16. In case of power failure, it is still possible to eject the cartridge 16. This is done through a 7.2 V NiCad battery 51 in the base unit. If the emergency eject switch is pushed, the battery voltage will be brought to the anode of a diode CR3 (FIG. 2D). Because +12 V is no longer present, the diode CR3 will be forward biased, and there will be voltage present at the Vcc inputs of the motor controller circuit 64. In addition the Vcc signal at the circuit 64 pulls the IN1 input to +6 V through a resistor R18. Thereupon, the cartridge 16 will eject. The NiCad battery 51 is recharged through a diode CR2 and a resistor R4 (FIG. 2C).

All eighteen SCSI signals are terminated by 110 ohm resistors and Schottky diodes as shown in FIG. 2D. A voltage regulator circuit 57 (FIG. 2C) provides a voltage of 3.35 volts which provides 2.85 V at the cathodes of the Schottky diodes when the SCSI signals are pulled low. The termination is turned off by turning off power to the voltage regulator 57 through the ET jumper at the jumper field JP2. The Schottky diodes prevent backflow between the SCSI signals when no power is present. The power for the termination is provided by the +5 V bus via a diode CR14. The cathode of the diode CR14 (through a thermistor) drives the TERMPWR pin of the SCSI bus 14. The TERMPWR pin provides termination power for those SCSI devices who have lost their conventional +5 V power, but still need to terminate the bus 14. The diode CR14 prevents backflow between TERMPWR and the +5 V bus.

Interface Circuits 19, 30

Turning now to FIGS. 3A through 3E, the substantially identical interface circuits 19 and 30, while most preferably formed as VLSI integrated CMOS circuitry, each implement a high level SCSI bus-type interface structure. While other intelligent interfaces may be employed, the presently preferred SCSI bus implementation is discussed herein as illustrative of details of a presently most preferred example for the interface circuit 19, 30. The SCSI interface 19, 30 is preferably configured to conform to the ANSI standard X3T9.2/82-2 Revision 17B at conformance level 2 for the small computer standard interface ("SCSI"), for example.

In the instance of the base unit 10, the interface 30 is controlled by a limited repertoire SCSI interface service routine executed by the base unit microcontroller 32, while in the case of the drive module 16, the interface 19 is controlled by a full repertoire SCSI interface service routine executed by the drive microcontroller 21. The interfaces 19 and 30 each include all of the hardware needed for controlling all critical timing operations on the SCSI interface bus 14. Decoding of commands, time-outs, and other non-critical timing operations are performed by the SCSI service routine.

Figure 3A:
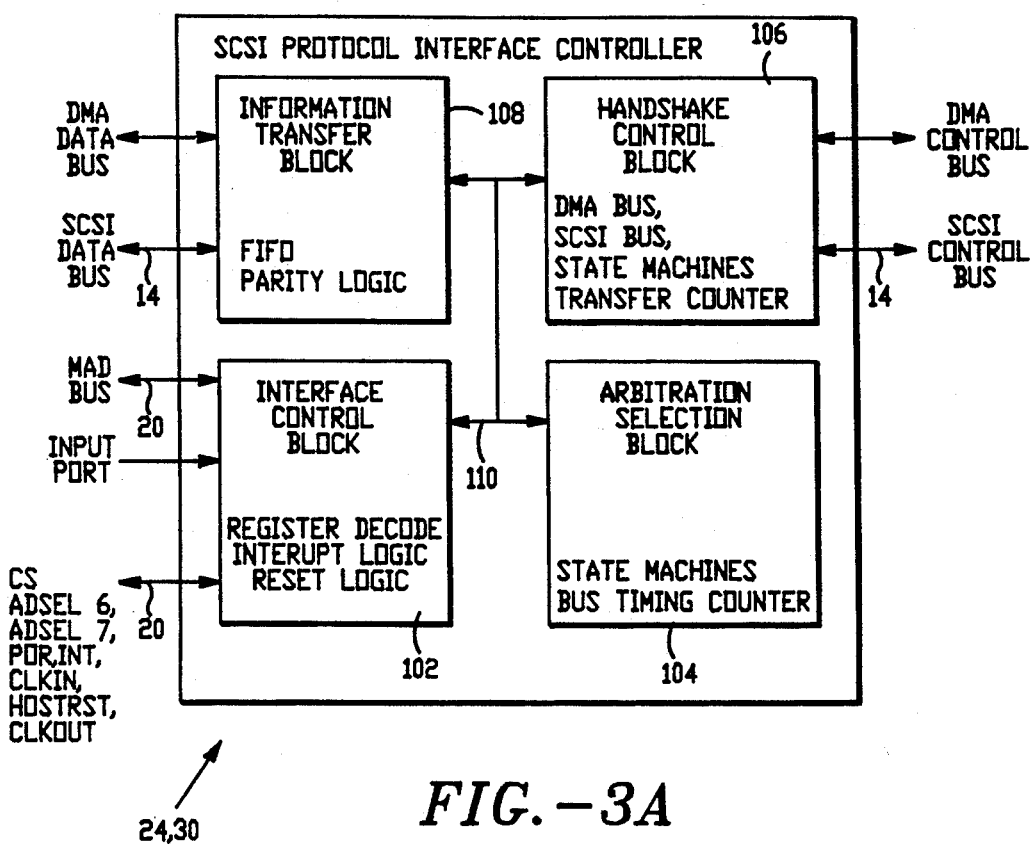
FIGS. 3A, 3B, 3C, 3D, and 3E comprise block diagrams of a SCSI interface integrated circuit of the type included within the base unit and the removable hard disk drive module of the FIG. 1 system.

In order to conform to the ANSI standard noted above, the interface circuits 19 and 30 implement eight distinct SCSI bus phases: bus free phase; arbitration phase; selection phase; reselection phase; command phase; data phase; status phase; and, message phase. As illustrated in FIG. 3A, in order to respond to these phases, the interface circuits 19 and 30 include an interface control block 102, an arbitration selection block 104, a handshake control block 106 and an information transfer block 108. While the blocks have certain external connections as shown in FIG. 3A, they are internally connected together via an internal bus 110. Each block will now be described in turn.

Figure 3C:
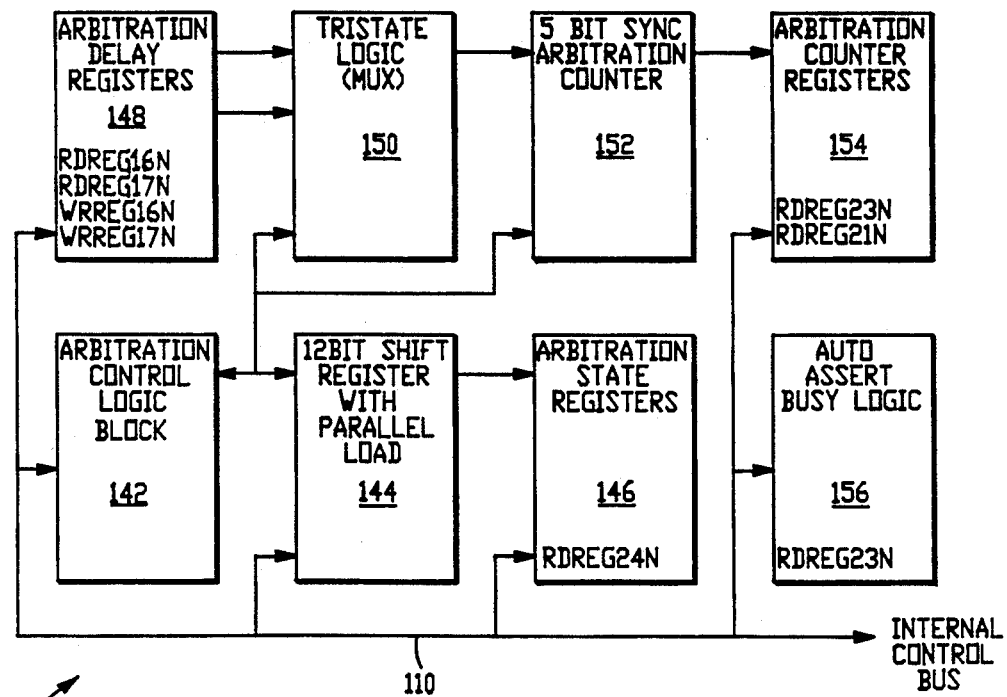
Figure 3B:
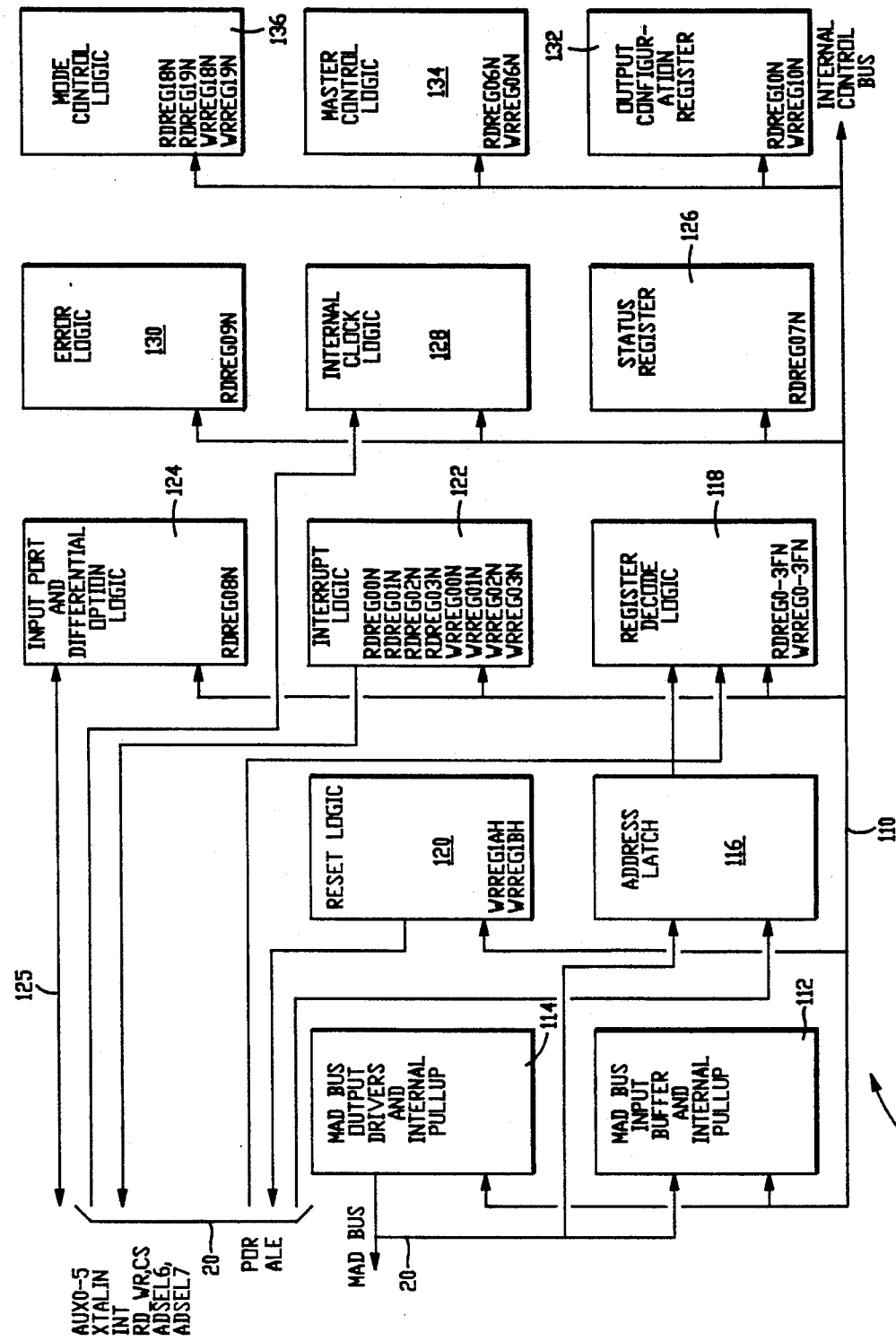

Turning to FIG. 3B, the interface control block 102 provides direct connections between the microcontroller 21, 32 and the interface 204. The interface control block 102 enables the interface circuit 19, 30 to appear to its respective microcontroller 21, 32 as an array of directly addressable registers. By writing to these registers, the microcontroller may arbitrate for the SCSI bus 14, select another device, such as the external disk housing and module 28 and, in the instance of the cartridge 16 initiate data transfers between the cartridge 16 and the host computer 24. By reading the directly addressable registers, the microcontroller 21 may determine the status of the interface circuit 19 and of the data transfer process, including error detection.

The interface control block 102 includes an input buffer and internal pullup block 112 which buffers data and addresses incoming from the microcontroller 21 via an address and data portion of the drive's microcontroller bus 20. An output leads directly to the internal bus structure 110. Likewise, outgoing data is buffered between the internal bus 110 and the microcontroller bus 20 by an output drivers and internal pullup block 114. An address latch 116 latches addresses of interface registers being read or written by the microcontroller 21. The address latch directly addresses a register decode logic block 118 which decodes each register address within the interface circuit 19 or 30. A reset logic block 120 enables the interface circuit 19, 30 to be reset at power on and as commanded under program control.

Figure 4:
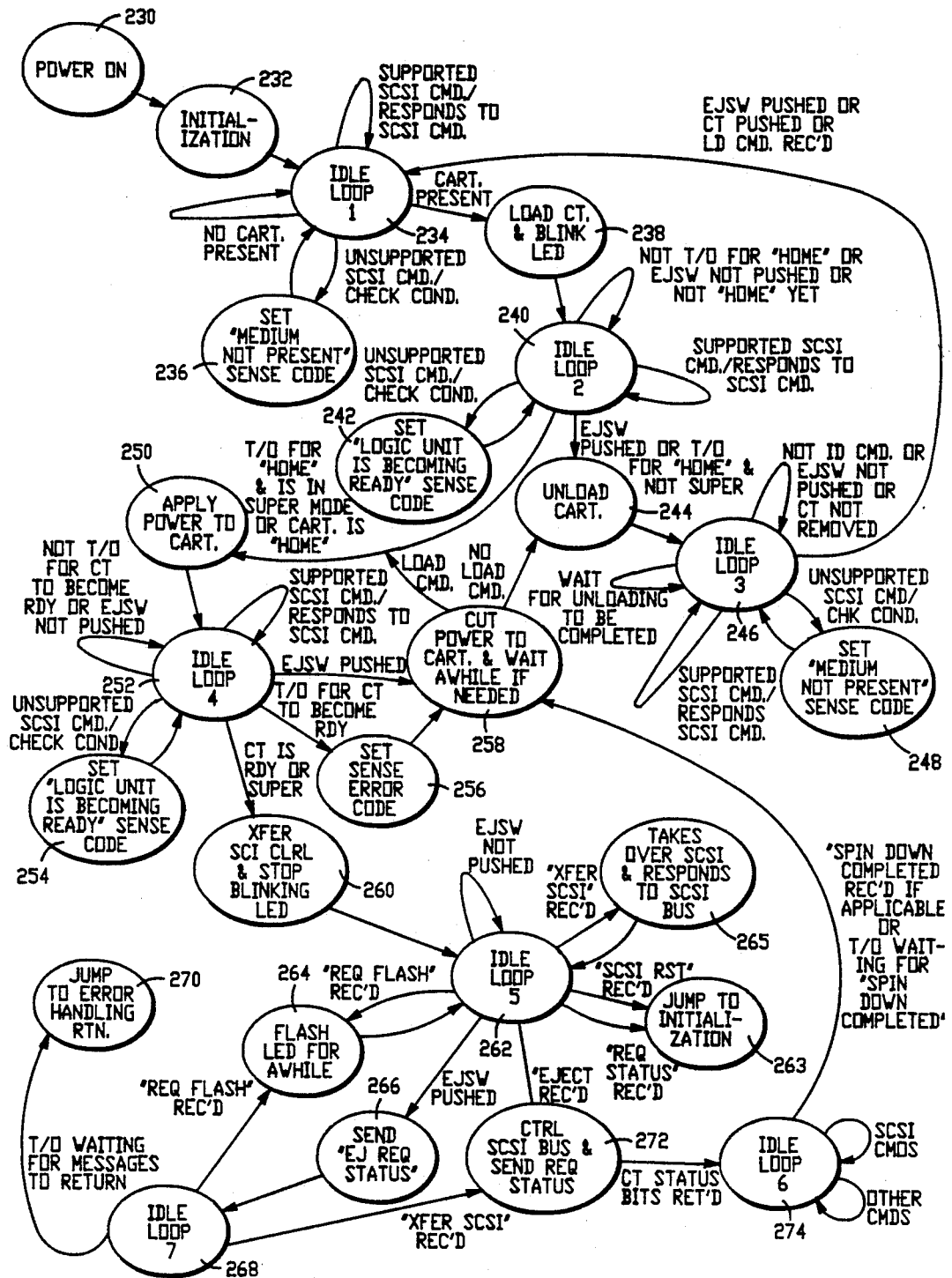
FIG. 4 is a logic state diagram illustrating operation of the base unit of the FIG. 1 subsystem.
Figure 5:
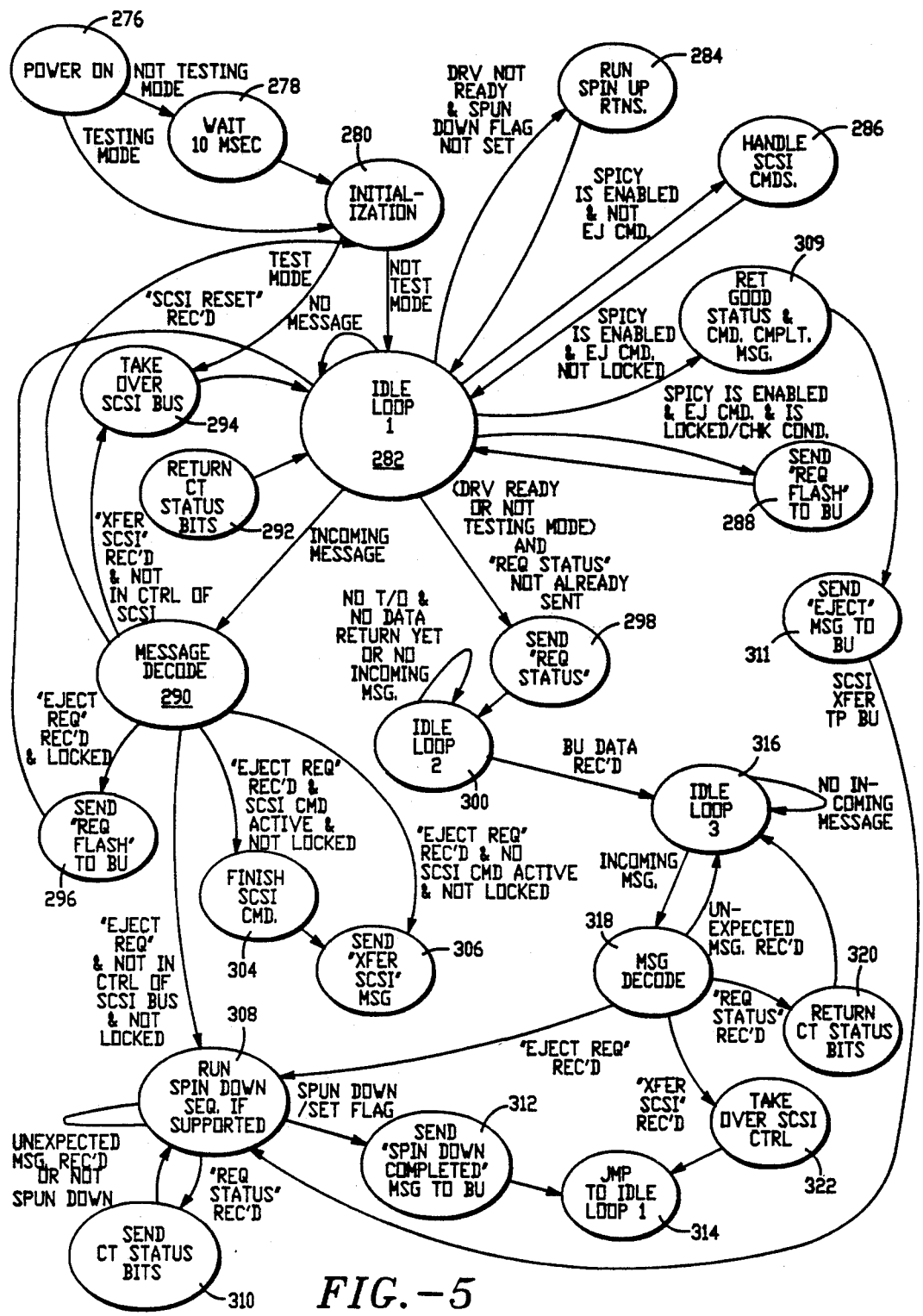
FIG. 5 is a logic state diagram illustrating operation of the hard disk drive module when operating within the FIG. 1 operational environment.

The interface control circuit 102 also includes an interrupt logic block 122 which enables certain interface control commands and values to be latched and passed onto the microcontroller 21, 32 and handled by the interface modules of the firmware, discussed in connection with the present example hereinafter in conjunction with FIGS. 4 and 5. These controls include BUSY which indicates that the SCSI bus 14 is presently busy; SELECT which is driven by an initiator to select a target or by a target (such as the base unit 10 or cartridge 16) to reselect an initiator; CONTROL/DATA which is a target driven signal and which indicates whether control or data information is presently on the data bus; INPUT/OUTPUT which is also a target driven signal and which controls the direction in which data moves on the data bus in relation to the initiator and which also distinguishes a selection and a reselection phase; MESSAGE which is a target driven signal during the message phase; REQUEST which is a target driven signal that requests a REQ/ACK data transfer handshake with the initiator; ACKNOWLEDGE which is an initiator driven signal that acknowledges a REQ/ACK data transfer handshake with the target; and, RESET which indicates the reset condition.

An input port and differential option logic block 124 supports an auxiliary input/output port 125 which may be used as a general purpose input port or for an external differential SCSI driver array. The interface control block 102 also includes a status register 126, an internal clock logic block 128, and error logic block 130, an output configuration register 132, a master control logic block 134 and a mode control logic block 136.

An arbitration phase enables one SCSI device to gain control of the SCSI bus 14 in order to assume the role of an initiator or a target. (The data storage module 16 always acts in the role of a target within SCSI. Thus, the base unit 10 also always acts as a SCSI target). As shown in FIG. 3C, the arbitration selection block 104 includes an arbitration control logic block 142, a 12 bit shift register with parallel load 144, a plurality of arbitration state registers 146, a plurality of arbitration delay registers 148, tri-state logic 150, a 5 bit sync arbitration counter 152, an arbitration counter register 154 and an auto assert busy logic circuit 156. The arbitration selection block 104 generates all of the signals needed for the arbitration and selection phase of the SCSI protocol. The auto assert busy state machine 156 generates all of the necessary signals to automatically respond during the selection phase. When enabled, this state machine 156 continuously monitors the SCSI bus 14 to determine if a device is attempting to connect to the disk cartridge 16 (or base unit 10 standing-in for the cartridge 16 when it is not present). The microcontroller 21, 32 accesses an arbitration delay register within the block 148 and an arbitration counter register 154, and reads an auto assert busy logic status register within the block 156.

Figure 3D:
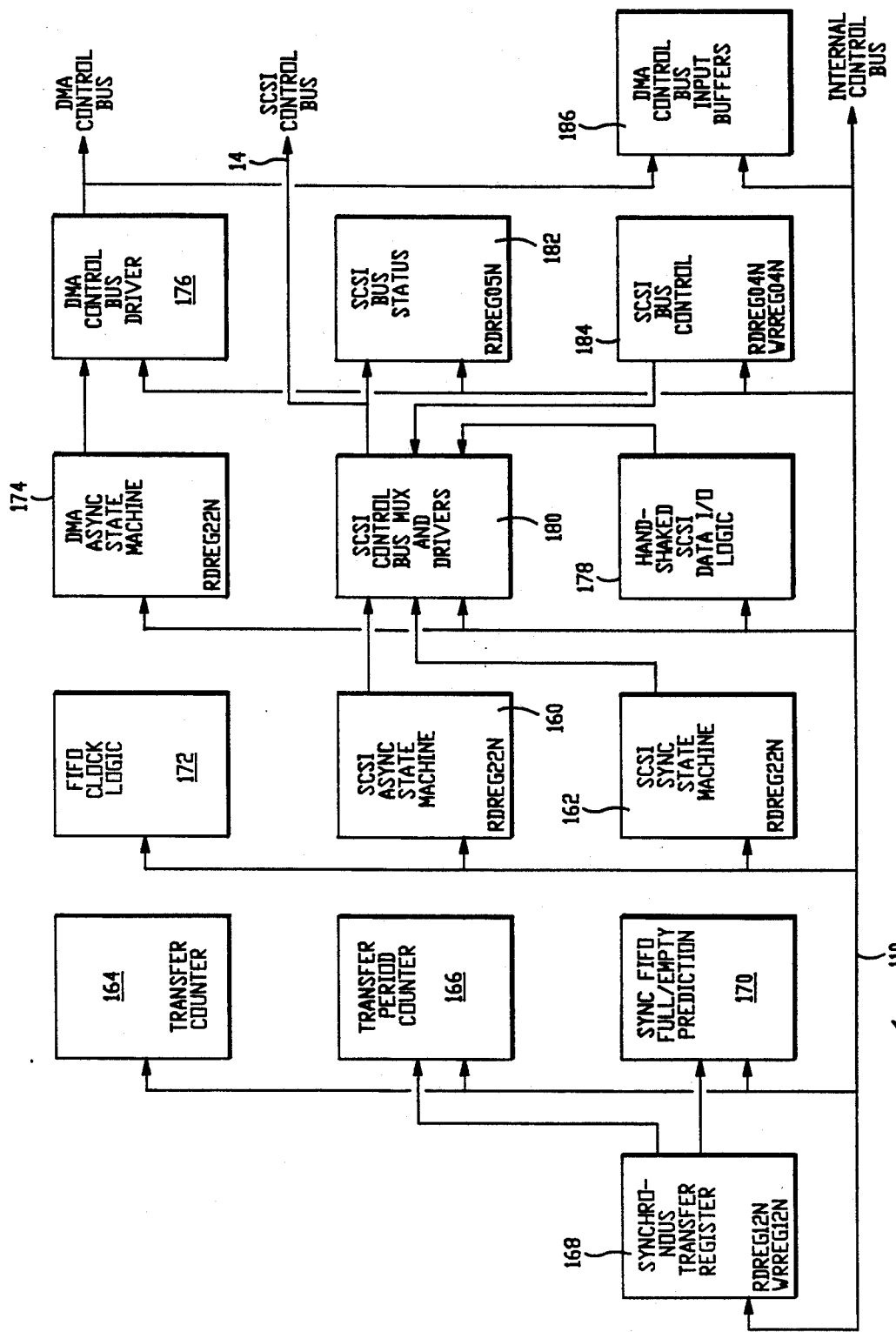

As shown in FIG. 3D, the interface circuit 19, 30 further includes the handshake control logic block 106 which enables data transfer over the SCSI bus 14 in an asynchronous handshake mode via an asynchronous SCSI state machine 160, or in a synchronous handshake mode via a synchronous SCSI state machine 162. This portion of the interface circuit 19, 30 includes a transfer counter 164 which keeps track of the data bytes being transferred, a transfer-period counter 166 which monitors the transfer period, a synchronous transfer register 168 accessible by the microcontroller 21, 32, a synchronous FIFO full/empty prediction circuit 170, a FIFO clock logic circuit 172 for clocking a data FIFO 188 (FIG. 3E) as well as the asynchronous and synchronous state machines which contain status registers readable by the microcontroller 21, 32, a buffer memory asynchronous state machine 174 for controlling clocking of information from the FIFO 188 into a data buffer memory also containing a register readable by the microcontroller 21, 32, a buffer memory control bus driver circuit 176 for driving handshake control values from the interface circuit 19 to an internal drive memory controller via an internal handshake control bus, handshaking logic 178 for data input/output via the external SCSI bus 14, the SCSI control bus multiplexer and driver circuits 180 for handling the control lines of the external SCSI bus 14, a SCSI bus status register 182 readable by the microcontroller 21, 32, and a SCSI bus control register 184 writeable and readable by the microcontroller 21. A buffer memory control bus input buffers circuit 186 buffers incoming control values from the drive internal memory controller over the buffer control/interface handshake control bus.

The SCSI bus driver circuits in the block 180 have the desirable property of presenting a high impedance to the SCSI bus 14 in the absence of any electrical power being applied to the circuit 19, 30. Thus, the interface circuits 19 and 30 may be connected to and disconnected from the SCSI bus 14 without any adverse effect, or interruption of the signal levels then appearing on the bus. In this manner, a "hot" connection and disconnection arrangement is realized. Details of preferred driver circuitry for the interface circuits 19, 30 are given in commonly assigned, copending U.S. patent application Ser. No. 07/735,882 to Raab et al., entitled "Bus Driver Having Active Pull-Up and Power Down Protection", now abandoned, the disclosure of which is hereby incorporated by reference.

The interface circuit 19, 30 further includes an information transfer block 108 (FIG. 3E) including the internal FIFO 188 which buffers data flow between the SCSI bus 14 and the drive's internal buffer memory 206. The FIFO 188 is arranged as a dual port register bank organized as 8 by 8 bits. The FIFO 188 enables synchronization of data flow with the internal clock operating the drive's internal buffer memory controller.

Figure 3E:
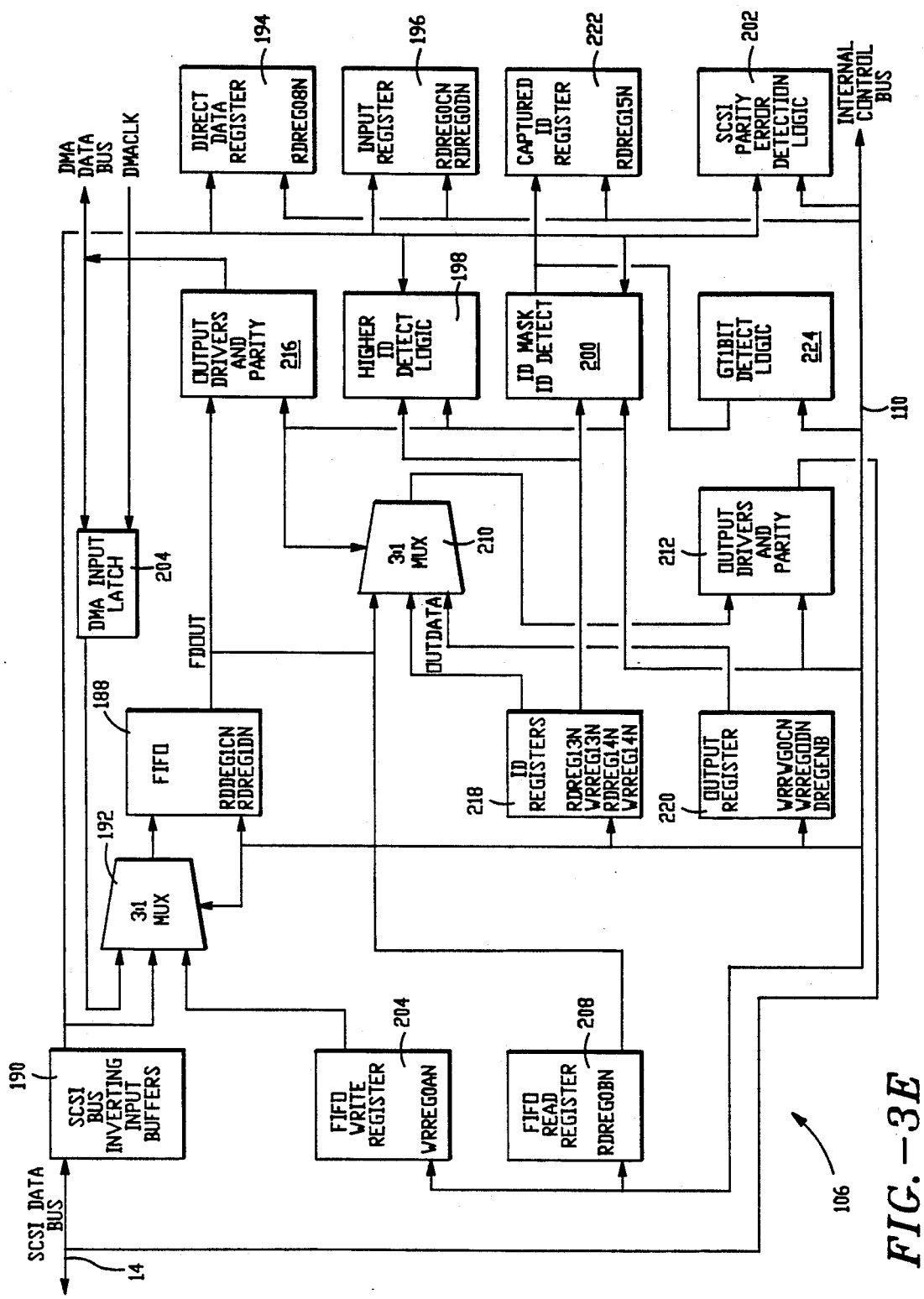

The information transfer block 108 includes a SCSI bus inverting input driver circuit 190 which buffers incoming information from the external SCSI bus 14 and circulates this information within the transfer block 108 as shown in FIG. 3E. One of the circuits fed by the inverting input driver circuit 190 is a three to one multiplexer 192 which directly feeds into the FIFO 188. Other circuits connected to the driver circuit 190 include a defect data register 194, an input register 196, a higher ID detect logic circuit 198, an ID mask and ID detect logic circuit 200, and a SCSI parity error detection logic circuit 202.

Data from the drive's internal buffer memory is passed through a DMA input latch 204 and the multiplexer 192 in order to reach the FIFO 188. The DMA input latch 204 is controlled by a DMA clock signal provided by the drive internal memory controller. Another input to the multiplexer 192 is provided by a FIFO write register 206 which enables the microcontroller 21 to write directly to a byte position of the FIFO 188 so as to be able to communicate directly with the host computer 24. Similarly, data from the FIFO 188 being sent on to the host 24 may also be written into a FIFO read register 208 and thereupon read by the microcontroller 21.

Data leaving the FIFO 188 passes either to the register 208, or through a second three to one multiplexer 210 which leads through an outgoing data drivers and parity logic circuit 212 feeding the SCSI bus 14, or an incoming data drivers and parity logic circuit 216 leading directly to the internal buffer memory data bus. Other inputs to the second three to one multiplexer 210 include connections from an ID registers block 218, and an output register 220. The ID registers block 218 also connects to the higher ID detect logic 198 and to the ID mask and ID detect logic block 200. The ID mask and ID detect logic block 200 connects to a captured ID register 222 and also to a Greater-Than-1 Bit logic block 224 via an internal path 226.

Base Unit Firmware

Turning now to the FIG. 4 flowchart, operations of the base unit 10 will now be described. A first node 230 represents a power on reset which initializes the microcontroller 32 and interface 30 of the base unit 10. During an initialization node 232, the microcontroller 32 sets certain initial values internally and defines its input and output port structure. After initialization 232 is completed, the program advances to a first idle loop 234. There are several loop conditions at the first idle loop 234. A first loop-around signifies that the cartridge 16 is not present in the base unit. During this condition, the base unit 10 remains at the first idle loop 234 and does not advance beyond this node.

Initially, the base unit 10 acts as the SCSI target on the external bus 14. Thus, a second loop-around is for supported SCSI commands received from the host computer 24. If a SCSI command is received from the host 24 which is supported by the base unit 10, a response is made by the base unit 10 as the stand-in for the data cartridge 16 to the host computer 24, and program control returns to the first idle loop 234. If a SCSI command is received from the host 24 over the SCSI bus 14 which the base unit 10 does not independently support, the base unit interface 30 returns a "check conditions" response to the host. Internally, program control advances to a node 236 which sets internally a "storage medium not present" sense code value which is then returned to the host 24 over the external SCSI bus 14 in response to a REQUEST SENSE command. Program control then returns to the first idle node 234.

Standard SCSI II commands supported by the base unit 10 independent of the presence of the cartridge 16 include REQUEST SENSE; INQUIRY; LOAD/UNLOAD; and SEND DIAGNOSTIC. Special commands unique to the base unit 10 include GROUP READ; GROUP WRITE; SUPER LOAD; SUPER TRANSFER; and, SUPER UNLOAD. One standard unsupported SCSI II command is PREVENT/ALLOW MEDIUM REMOVAL. If this command is received from the host 24, the program node 236 causes the "medium not present" message to be returned to the host 24. A similar response is given by the base unit 10 to a TEST DRIVE READY command from the host 24.

A sense switch in the base unit 10 senses that a cartridge 16 has been inserted into the base unit to an initial load position. This condition is sensed by the base unit 10, and program control passes to a load cartridge node 238. The load mechanism 43 is thereupon energized, and draws the cartridge 16 from the initial load position into a fully loaded position at which the connectors 22 and 31 are electrically engaged. During the cartridge loading interval, the base unit LED is flashed to indicate the duration of the loading process to the user. A second idle loop 240 is reached during the loading interval, which takes several seconds. The second idle loop 240 again includes three internal loop conditions. A first loop condition occurs when an internal time out duration has not yet been reached for the cartridge loading process, or when a cartridge eject switch has not been depressed by the user, or when the cartridge 16 is not "home" i.e. fully loaded yet. A second loop services base unit supported SCSI commands. A third loop leads to a node 242. If the host asserts an unsupported SCSI command while the base unit 10 is at the second idle loop 240, it returns a check conditions response. At the same time, the node 242 sets an internal sense code that "logic unit is becoming ready". This sense code is then returned by the base unit to the host after the host issues a REQUEST SENSE.

In the event that while the cartridge 16 is becoming ready the user depresses the cartridge eject switch, or in the event of a time out while the cartridge is becoming ready, meaning that too much time has elapsed for the cartridge to reach the home position, an unload cartridge node 244 is reached. This node 244 causes the mechanism 43 to reverse its direction and cause the cartridge 16 to begin to be ejected. A third idle loop 246 is then reached. The third loop includes four internal loop conditions, including a wait for the unloading process to be completed, a supported SCSI command and response loop-around, a not load command or eject switch not pushed or cartridge not removed loop condition, and an unsupported SCSI command/check conditions loop condition which passes through a node 248 which sets a sense code of "medium not present" for return to the host upon sending of the REQUEST SENSE command. If the eject switch has been pushed, or if the cartridge 16 has been physically removed from the base unit, or if a LOAD command has been received, a return is made directly from the third idle loop node 246 to the first idle loop node 234.

Assuming that the conditions leading to the unload cartridge node 244 have not occurred, a node 250 is reached from the second idle loop 240. The node 250 begins the power on sequence to the cartridge 16, and a fourth idle loop 252 is then reached. Several internal loop conditions are present at the fourth idle loop 252. These include a loop condition which occurs so long as a preset timeout for the cartridge to become ready has not elapsed or the eject switch has not been pressed. Another loop condition services supported SCSI commands from the host 24. A third loop condition, passing through a node 254, handles unsupported SCSI commands. The node 254 sets the sense code to "logic unit is becoming ready".

If a timeout occurs for the cartridge to become ready, the fourth idle loop is departed, and a set sense timeout error code node 256 is reached at which a timeout error code is set into the sense register of the interface 30. Program control then passes to a node 258 which withdraws power from the cartridge 16 and imposes e.g. a 15 second wait until the disk stops spinning, etc. If the eject switch is depressed, the node 258 is reached directly from the fourth idle loop 252. If a LOAD command has been sent by the host, a branch is made from the node 258 to the third idle loop 246. If LOAD command has not been asserted, the unload cartridge node 244 is reached from the node 258.

If none of the foregoing conditions are sensed at the fourth idle loop 252, the cartridge 16 is deemed to be ready to assume control of the SCSI bus 14, and a node 260 is reached. At the node 260, a command requesting transfer of SCSI bus control is passed to the base unit 10 from the cartridge 16 via the private bus 15, and the base unit 10 responds by relinquishing SCSI bus control to the cartridge 16. Also, the base unit LED flashing is stopped. A fifth idle loop 262 is then reached. The base unit 10 spends most of its time at the fifth idle loop 262 while the cartridge 16 is loaded and actively present on the SCSI bus 14. While the SCSI interface 30 is not active, the base unit microcontroller 32 remains in communication with the cartridge microcontroller 21 via the special bus 15. Also, the base unit 10 continues to monitor conditions, such as the eject switch. So long as no commands are received from the cartridge 16 or the eject switch is not pushed, an internal loop-around keeps program control of the base unit 10 at the fifth idle node 262.

While at the fifth idle loop 262, one loop condition relates to the handling of a "TRANSFER SCSI" message received from the cartridge. When this message is received, a node 265 in this loop condition causes the base unit interface 30 to take control of the SCSI bus 14 as the stand-in for the cartridge and thereupon respond to supported and unsupported SCSI commands as explained previously. If the cartridge 16 sends a "REQUEST STATUS" message, which would ordinarily be unexpected during normal operation and may signal a reinitialization occurring at the cartridge, the base unit 10 jumps to the initialization node 232 and immediately takes over the SCSI bus.

If a REQ FLASH command is received from the cartridge 16 (meaning that it is locked and cannot be ejected), a node 264 is reached at which the base unit LED is flashed for a time, e.g. 5 seconds, and a return is made to the fifth idle loop 262. If the eject switch is pushed, a node 266 is reached which causes an "EJECT REQUEST" signal to be sent to the cartridge 16 via the dedicated bus 15 in order to inform the cartridge of this occurrence. (The cartridge 16 may be in the middle of a SCSI bus transaction, and will await completion of the transaction before honoring the EJECT REQUEST message from the base unit 10.) A seventh idle loop 268 is then reached while the cartridge 16 completes its current SCSI bus 14 transaction and begins a sequence leading to power down and removal. If a "REQUEST FLASH" command is received from the cartridge 16 while at the seventh idle loop 268, a branch is made to the flash LED node 264 and a return is made to the fifth idle loop 262, thereby indicating that the cartridge 16 is locked and cannot be ejected at the present time. If a timeout occurs while waiting for messages from the cartridge to return, an error node 270 is reached which causes error handling routines to be invoked.

If a "TRANSFER SCSI" command is received from the cartridge 16, meaning that it is now ready to be ejected, a takeover SCSI bus node 272 is reached at which the base unit 10 takes over control of the SCSI bus 14 as the stand-in for the cartridge 16, and the cartridge interface circuit 21 stops responding to the SCSI bus 14. The base unit 10 then sends a "REQUEST STATUS" message to the cartridge 16 and enters a sixth idle loop 274 while awaiting receipt of the cartridge's status bits. When a "spin down complete" status value is received from the cartridge 16, or after a spin down timeout period has elasped, program control branches to the cut power node 258.

The following table summarizes the messages which may be exchanged between the base unit 10 and the cartridge 16 via the serial data line of the private bus 15:

| BASE UNIT | CARTRIDGE | 3 BIT ENCODE |
|---|---|---|
| TRANSFER SCSI | TRANSFER SCSI | 000 |
| BASE UNIT IN SUPERMODE | (UNUSED) | 001 |
| EJECT REQUEST | EJECT | 010 |
| REQUEST STATUS | REQUEST STATUS | 011 |
| (UNUSED) | REQUEST FLASH | 100 |
| (UNUSED) | SPIN DOWN COMPLETE | 101 |

Cartridge 16 Firmware

The cartridge control firmware implements all of the features and functions required for functioning as a self-contained fixed disk drive including e.g. the SCSI bus level interface 21. In addition, special firmware described in FIG. 5 enables the cartridge to communicate with the base unit 10 in a manner facilitating transfer of SCSI bus control to and from the base unit. A power-on node 276 is pointed to at power on reset of the disk cartridge 16 immediately after the base unit 10 has supplied power to the cartridge 16. If the cartridge 16 is not in a testing mode, a short delay node 278 is reached in order to supply a suitably short delay to neutralize any possible adverse effects from power glitches on the power supply lines supplying the cartridge. An initialization node 280 is then reached. If the cartridge 16 is in a testing mode, the delay node 278 is skipped, and the firmware proceeds directly to the initialization node 280. The initialization node 280 causes the cartridge 16 to become initialized, including head positioner servo initialization. A first idle loop 282 is then reached.

There are several loop conditions at the first idle loop 282. A first loop condition occurs for so long as the cartridge is "not ready" and the spun-down flag is not set. A node 284 is passed through which causes a drive "spin-up" background routine to be executed which spins up the spindle motor and disk(s). Another loop condition occurs for so long as no messages have been received from the base unit 10. (A third loop condition occurs if a SCSI command has been received (except for the EJECT command) and the SCSI interface chip 19 is enabled. The command will be decoded and executed.) A fourth loop condition occurs if the SCSI interface 19 is enabled and the eject command is received from the host 24 and if the cartridge 16 is locked. In this event, a check condition is returned to the host, and a node 288 causes "REQUEST FLASH" message to be sent to the base unit 10.

When the cartridge 16 becomes "ready", meaning that it is in condition to take over the SCSI bus 14, and a request status message has not already been sent, a REQUEST STATUS message is sent by the cartridge 16 at a node 298 to the base unit, and a second idle loop 300 is reached. A loop condition occurs at the second idle loop 300 for so long as there is no data returned by the base unit 10 and there are no incoming messages from the base unit. If there is an incoming message from the base unit 10, a branch is made from the second idle loop 300 to the message decode node 290.

If there is an incoming message from the base unit 10 via the private bus 15, a message decode node 290 is entered from the first idle loop 282. The message decode node 290 decodes the message. For example, if a REQUEST STATUS message is received from the base unit 10, a node 292 is entered which causes the status bits for the cartridge 16 to be returned to the base unit. If the base unit message is "TRANSFER SCSI" and the cartridge 16 is not presently in control of the SCSI bus 14, then a node 294 is reached which causes the cartridge to take over the SCSI bus 14 by enabling the on-board interface chip 19 and then returning to the first idle loop 282. If a message BU SUPER is received, a return is made directly to the idle loop, and the firmware is then armed to handle the message superset. If the message decoded is EJECT REQUEST, and the cartridge 16 is soft-locked by command from the host 24, a node 296 causes a message REQUEST FLASH to be sent to the base unit 10, and a return is made to the message decode node.

If an EJECT REQUEST message is decoded while a SCSI command is being processed and the drive is not locked, a node 304 delays further action until the SCSI command is processed. Then, a node 306 causes a TRANSFER SCSI message to be sent by the cartridge 16 to the base unit 10 and SCSI control is passed back to the base unit SCSI interface 30 as stand-in for the cartridge 16. In the event that an EJECT REQUEST message is decoded at the message decode node 290 and no SCSI command is then active and the cartridge is not locked, the node 306 is reached directly from the message decode node 290.

Once SCSI control is passed back to the base unit 10 from the cartridge 16, a run spin down sequence node 308 is reached, and if spin down is supported by the cartridge firmware, the disk begins to spin down, while the head positioner parks the data transducers in a landing zone or parking area. If a REQUEST STATUS message is received from the base unit 10 during spin down, a node 310 causes the cartridge status bits to be returned. If an unexpected message is received, or the disk has not completed spinning down, the message is ignored, and a loop condition occurs at the spin down node 308. Once the disk has spun down, a spindown flag has been set, a node 312 is reached at which a SPIN DOWN COMPLETED message is sent by the cartridge 16 to the base unit 10. Then, a jump node 314 is reached which causes a jump back to the first idle loop 282.

Returning now to the second idle loop 300, if data from the base unit 10 is received in response to the REQUEST STATUS message previously sent by the cartridge 16, a third idle loop 316 is reached. A looparound occurs at the third idle loop 316 until a message from the base unit 10 arrives. When a message comes in, a message decode node 318 is entered. If the message REQUEST STATUS is received, a node 320 causes the cartridge's status bits to be returned. If a TRANSFER SCSI message is received from the base unit 10, a node 322 is reached which causes the cartridge 16 to take over the SCSI bus 14. The node 322 is the nominal destination node during each cartridge insert and spin up sequence, and will ordinarily be reached very soon after the cartridge sends the REQUEST STATUS message to the base unit at the node 298. Once the cartridge has taken over control of the SCSI bus 14 from the base unit, the jump node 314 is reached, and a jump is made to the first idle state.

If the interface is enabled and an eject command is received and the cartridge 16 is not locked, a node 309 is reached from the first idle loop 282. This node 309 is immediately followed by a node 311 which sends the EJECT message to the base unit 10 and causes transfer of the SCSI bus 14 to the base unit 10. Thereupon, the run spin down node 308 is reached and operations progress as previously described.

Communication Timing

Figure 6:
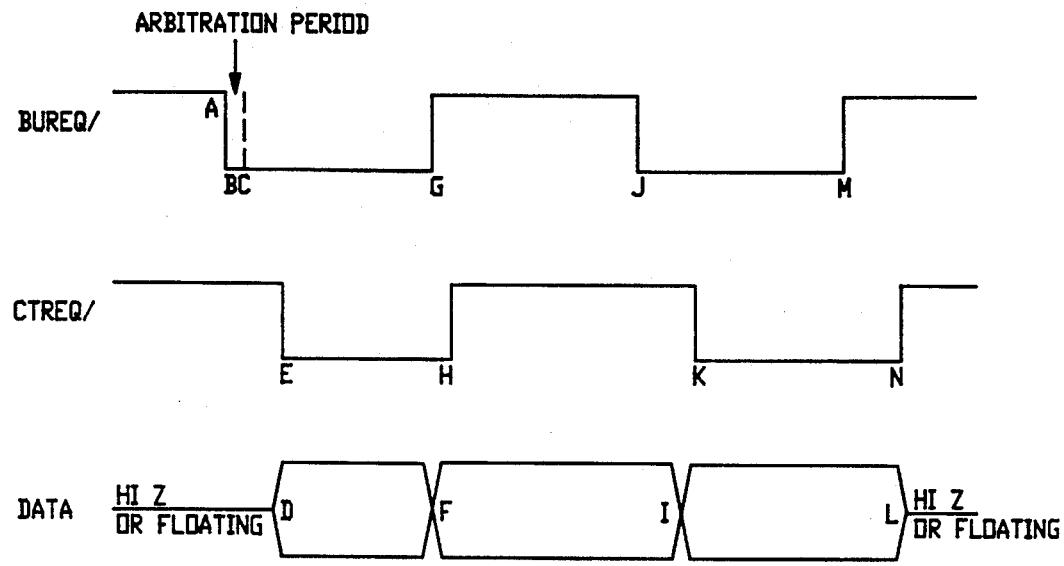
FIG. 6 represents a handshake timing diagram illustrating cooperative operation of the base unit and drive module of the FIG. 1 storage subsystem.
Figure 6:
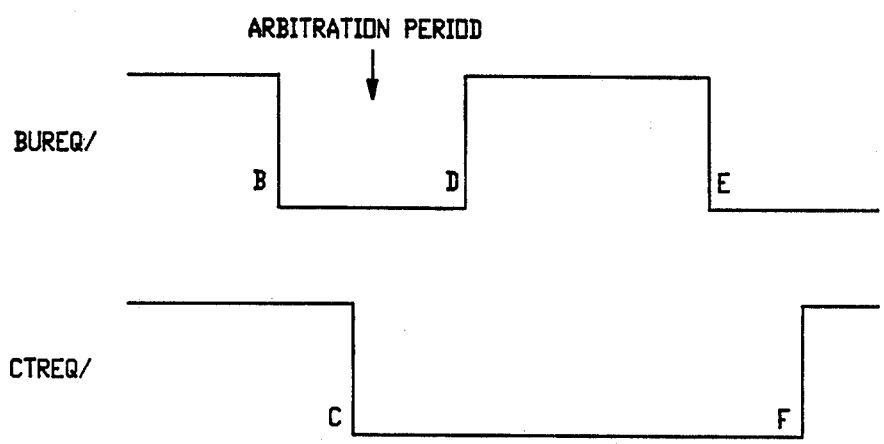

Turning now to the upper three graphs of FIG. 6, at time A, the base unit 10 verifies that the cartridge is not requesting the private bus 15 by checking the state of the CTREQ line. At time B, the base unit asserts BUREQ (low) to ask for the data bus. At time C, the base unit 10 is awaiting an arbitration period to see if the cartridge desires the bus 15. At time D, the base unit drives data bit zero onto the data line of the bus 15. At time E, the cartridge 16 reads data bit zero and then asserts CTREQ (low) in order to acknowledge receipt of the data bit. The cartridge 16 must wait for the arbitration period plus the amount of time it takes the base unit to drive data bit zero before reading the data.

At time F, upon seeing CTREQ (low) asserted, the base unit drives data bit one and then indicates to the cartridge that bit one is valid by deasserting BUREQ (high) at time G. At time H the cartridge responds by reading data bit one and then deasserting CTREQ (high) in order to indicate receipt of the data bit. Unlike the event at time E, the cartridge may deassert CTREQ immediately, because the arbitration period has already been completed.

Times I, J and K comprise a repeat of the above sequences for data bit two. Since this is the last bit to be sent, the receiver should deassert its request after it has read in the final bit and interpreted the e.g. three bit command. At time L the data transfer is completed by the base unit 10, so it stops driving the bus and deasserts BUREQ (high) at time M. At time N, the transfer is completed, so the cartridge 16 deasserts its CTREQ. At this point, the cartridge returns to polling for a base unit request. The base unit returns to polling when it sees the transition to high of CTREQ at time N. The receiver should wait for some minimum time after the transition at time N before sending a message to be sure that the original sender will see the transition at time N.

In the event of a simultaneous bus request by the base unit and the cartridge, an arbitration occurs. This process is illustrated by the lower two graphs of FIG. 6. At time A, the cartridge 16 checks to see if the base unit has asserted its BUREQ, which it has not at that time. At time B, however, the base unit 10 asserts its BUREQ. At time C the base unit sees that the cartridge has requested the bus. The cartridge has priority in bus access, so the base unit 10 deasserts BUREQ at time D. At time E the base unit 10 reasserts BUREQ (low) to indicate that it has received the first data bit. At time F, the cartridge sends the next data bit. This process then follows until all data bits have been received.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A mass storage subsystem connectable to a host computer and comprising subsystem bus means extending from the host computer to at least one base unit and a removable disk drive cartridge, and a control signal path between the base unit and the removable disk drive cartridge when installed and connected within the base unit;

the removable disk drive cartridge including:
    housing means,
    at least one storage disk rotatably mounted within the housing means,
    at least one data transducer head within the housing means and positionable by head positioning means at selected concentric data storage tracks defined on a storage surface of the storage disk for writing and reading user data to and from the host computer,
    drive electronics means including said head positioning means and further including bus interface circuit means for directly connecting to said subsystem bus means when the cartridge means is installed and connected within the base unit and cartridge controller means for controlling operations of said bus interface circuit means and said head positioning means and for communicating with said base unit via the control signal path, the base unit comprising:
    disk cartridge receiving means for receiving and connecting a said disk drive cartridge means,
    stand-in interface circuit means connected to the subsystem bus means when the disk drive cartridge is not connected and operable within the base unit, for presenting an active and "drive not ready" disk cartridge electrical appearance to the subsystem bus means, and connected to the subsystem bus means in parallel with the bus interface circuit means when the disk drive cartridge is operating within the base unit,
    base unit controller means including cartridge control means for controlling operations of said disk cartridge receiving means for receiving and connecting the disk drive cartridge, and stand-in interface control means for responding to a "drive ready" signal from the cartridge controller means via the control signal path following connection of the disk drive module and for thereupon electronically discontinuing stand-in operation of the stand-in interface circuit means.

2. The mass storage subsystem set forth in claim 1 wherein the subsystem bus means comprises SCSI bus means and wherein the bus interface circuit means of the cartridge and the stand-in interface circuit means of the base unit comprise SCSI interfaces.

3. The mass storage subsystem set forth in claim 1 comprising a plurality of base units connected to said subsystem bus means.

4. The mass storage subsystem set forth in claim 1 wherein said control signal path between the base unit and the installed and connected disk drive cartridge comprises a dedicated control path separate from said subsystem bus means.

5. The mass storage subsystem set forth in claim 1 wherein a logical address of the bus interface circuit means of the cartridge means at the subsystem bus means is the same as a logical address of the stand-in interface circuit means.

6. The mass storage subsystem set forth in claim 1 comprising bus pullup means for supplying electrical power to the subsystem bus means.

7. The mass storage subsystem set forth in claim 1 wherein the bus interface circuit means of the cartridge, and the stand-in interface circuit means each includes bus driver means having power down electronic isolation means for isolating the said interface circuit means in the absence of primary power supply, thereby enabling the cartridge means to be hot-connected to and hot-removed from the subsystem bus means without interfering with signal conditions present thereon during the connection/removal operation.

8. A method for controlling a mass storage subsystem connectable to a host computer via a host adapter means and comprising subsystem bus means extending from the host adapter means to at least one base unit and a removable disk drive cartridge, and a control signal path between the base unit and the removable disk drive cartridge when installed and connected within the base unit, the disk drive cartridge including housing means, at least one storage disk rotatably mounted within the housing means, at least one data transducer head within the housing means and positionable by head positioning means at selected concentric data storage tracks defined on a storage surface of the storage disk, disk cartridge interface circuit means for directly connecting to said subsystem bus means when the cartridge means is installed and connected within the base unit and cartridge controller means for controlling operations of said disk cartridge interface circuit means and said head positioning means and for communicating with said base unit via the control signal path, the method comprising the steps of:

emulating at the base unit an electrical appearance of a said disk drive cartridge means in a non-operative active condition at a predetermined logical address of the subsystem bus means with stand-in interface circuit means when the said disk drive cartridge is not installed and connected within the base unit, receiving and connecting at the base unit a said disk drive cartridge directly to the subsystem bus means, and communicating with the cartridge controller means via the control signal path in order to determine that the disk cartridge interface circuit means is ready to assume an operative active condition at the subsystem bus means and thereupon causing the stand-in interface circuit means to remove its electrical appearance from the subsystem bus means and to cause the cartridge interface means to present an operative active condition at the predetermined logical address of the subsystem bus means.

9. The method set forth in claim 8 wherein the subsystem bus means comprises a SCSI bus.

10. The method set forth in claim 8 comprising the further step of isolating the interface circuit means of the cartridge means in the absence of primary power supply thereto, thereby enabling the cartridge means to be hot-connected to and hot-removed from the subsystem bus means without interference to signal conditions thereon during the connection/removal operation.

11. The method set forth in claim 8 comprising the further steps of:

receiving and decoding a cartridge unload signal at the cartridge controller means, relaying the cartridge unload signal from the cartridge controller means to the base unit controller means via the control signal path, causing the stand-in controller means to present an active electrical "drive not ready" appearance at the predetermined logical address of the system bus means, removing the electrical appearance of the cartridge interface means from the predetermined logical address of the system bus preparatory to removal of the cartridge from the base unit.

12. The method set forth in claim 11 comprising the further step of automatically ejecting the disk drive cartridge from the base unit following the step of removing the electrical appearance of the cartridge interface means from the predetermined logical address of the system bus means.

13. In a data storage subsystem including a removable hard disk drive module including a bus-level interface circuit means and a base unit for automatically loading and unloading the hard disk drive module in response to control signals received from a host computer to which the base unit is connected via a host bus adapter, a method for passing between the module and the base unit of an electrical appearance of the data storage subsystem to the computer at a predetermined logical address, the method comprising the steps of:

presenting via a stand-in interface circuit means of the base unit an active electrical "drive not ready" appearance to the host computer at the predetermined logical address when the drive module is not loaded and ready for data transfer operations, determining at the base unit when the drive module becomes loaded and ready for data transfer operations and thereupon activating the bus-level interface circuit means of the drive module at the predetermined logical address and disabling the stand-in interface circuit means, and determining at the base unit when the drive module is about to be unloaded and thereupon activating the stand-in interface circuit means at the predetermined logical address and disabling the appearance of the bus-level interface circuit means of the drive module at the predetermined logical address.

* * * * *